Feb. 17, 1942.  E. C. MOSS ET AL  2,273,133
STRAND HANDLING APPARATUS
Filed April 9, 1940
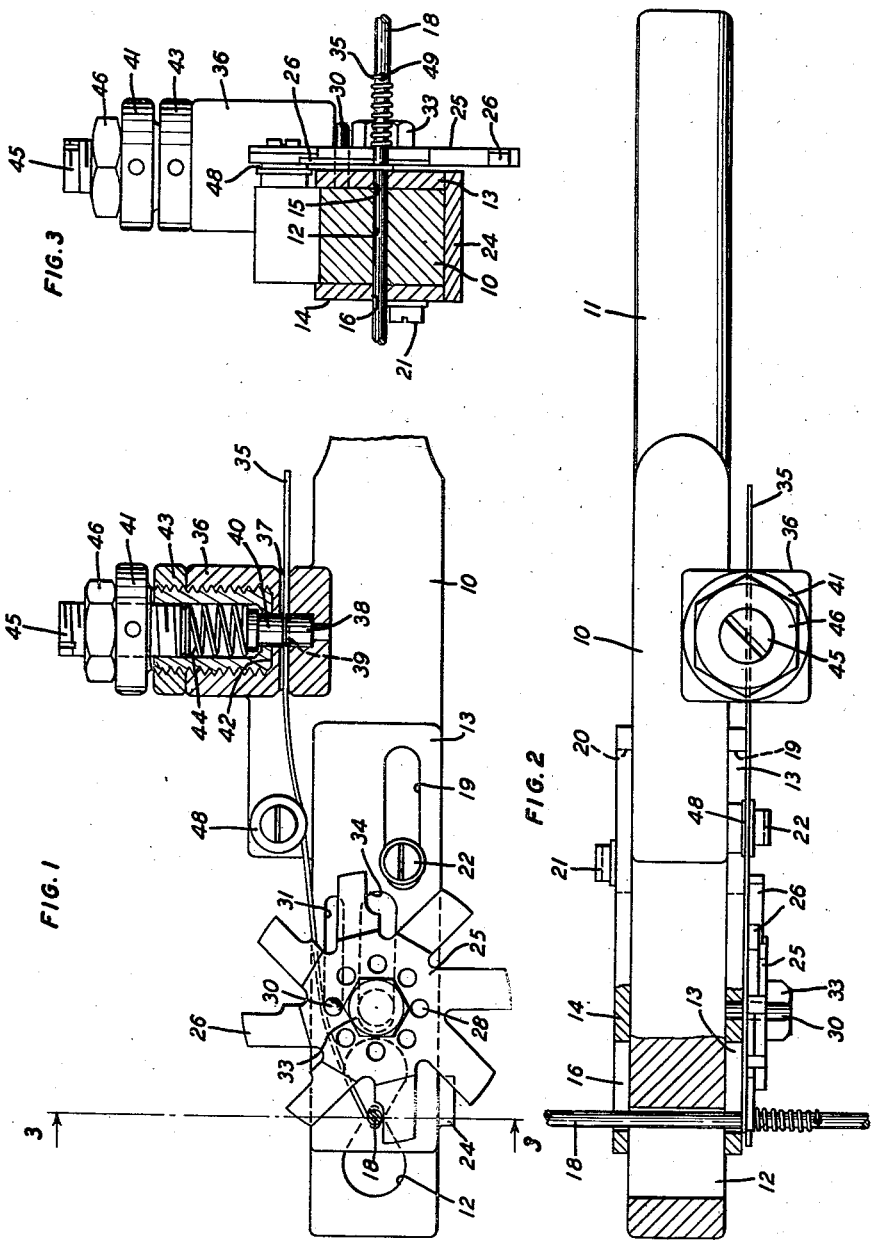
INVENTORS
E. C. MOSS
J. F. WILLIAMS
BY
E. R. Nowlan
ATTORNEY Patented Feb. 17, 1942

2,273,133

UNITED STATES PATENT OFFICE 2,273,133

STRAND HANDLING APPARATUS

Earl C. Moss, Westfield, N. J., and James F. Williams, Dundalk, Md., assignors to Western Electric Company, Incorporated, New York, N. Y., a corporation of New York Application April 9, 1940, Serial No. 328,612

7 Claims. (Cl. 140—124)

This invention relates to strand handling apparatus, and more particularly to manually operable apparatus for forming helical springs.

The occasional requirements for small quantities of helical springs which vary in pitch and size from the obtainable standard springs and which do not warrant the development of an automatic machine for the manufacture thereof, have presented a problem of forming such springs by an inexpensive device, variable to produce springs of various pitches, various diameters and various gages.

An object of the invention is to provide a strand handling apparatus and more particularly a spring former which is simple in structure, inexpensive to manufacture and highly variable for the formation of helical springs of various gages, pitches and diameters.

With this and other objects in view, the invention comprises a body having an aperture cooperating with an aperture of a member to form an opening variable in contour for various types of arbors, an element having pitch controlling elements variable in contour and selectively positioned adjacent an arbor in the opening to control the pitch of a wire spring, and a wire tensioning means to create a variable tension in the wire, depending upon the type of wire used and the diameter of the spring desired.

Other objects and advantages will be apparent from the following detailed description when taken in conjunction with the accompanying drawing, wherein Fig. 1 is a fragmentary side elevational view of the apparatus, portions thereof being shown in section;

Fig. 2 is a top plan view of the apparatus, portions thereof being shown in section, and Fig. 3 is a vertical sectional view taken substantially along the line 3—3 of Fig. 1.

Referring now to the drawing, the apparatus comprises a body 10 with one end provided with a handle 11 while the other end is provided with an aperture 12 extending therethrough as shown in Fig. 2 and of the cross sectional contour throughout its length as shown in Fig. 1. This aperture somewhat simulates a large opening and a smaller opening, spaced therefrom, with parallel centers and both openings joined into one by tangential lines forming tapered surfaces of the opening, increasing in size from the similar inner portion to the maximum size at the outer portion. Adjustable members 13 and 14 in the form of plates are disposed one on each side of the body 10 and are provided with apertures 15 and 16 respectively, identical in contour to the aperture 12 but in reverse order, as illustrated in Fig. 1, to cooperate with the aperture 12 in forming an opening variable in size for various sizes of arbors, this opening being variable from the size shown in Fig. 1 for the arbor indicated at 18, or even smaller if desired, to the maximum opening when the large portions of the apertures 15 and 16 have been moved in central alignment with the large portion of the aperture 12.

The members 13 and 14 have elongate apertures 19 and 20, respectively, for receiving holding means such as screws 21 and 22, respectively, threadedly carried in apertures of the body 10 for holding the members in any desired adjusted positions. The forward ends of the members 13 and 14 rest upon an integral lug 24 disposed on the under side of the body as shown in Figs. 1 and 3, and projecting outwardly upon each side thereof to provide supporting surfaces for the members.

An element in the form of a wheel 25 has a plurality of teeth 26 extending substantially radially therefrom for controlling the pitch of a spring formed on the arbor. The teeth 26 vary in contour, that is, in thickness, for example, from the thinnest one disposed adjacent the arbor in Fig. 1, the successive teeth advancing clockwise about the element being of greater width, to the one of maximum width immediately below the first mentioned tooth. One aperture 28 is formed in the element for each tooth thereof. In the present instance there are eight teeth and eight apertures for locating the respective teeth in controlling positions adjacent the opening for the arbor. A pin 30 is rigidly mounted in an aperture (not shown) formed in the body 10 and has a rounded outer end readily receivable in any one of the apertures 28. An elongate opening 31 is disposed in the member 13 to allow movement of the member relative to the pin 30 of the body 10. The wheel 25 is supported by a screw 33 threadedly receivable in the aperture (not shown) in the body 10 and passing through an elongate opening 34 in the member 13 which is also necessary for the longitudinal adjustment of the member relative to the screw.

A tensioning means is provided, to create a desired tension in wires, such as that indicated at 35 of which springs are to be formed. This tensioning means consists of a hollow member 36 mounted upon or formed integral with the body 10 and having a passageway 37 therethrough for the wire 35. The lower portion of the member 36 is apertured to receive and support a tension shoe 38, which in the present instance is cylindrical in general contour, with a groove 39 in its upper surface for the passage of the wire therethrough, the groove being aligned with the passageway 37. The size of the aperture in which the shoe 38 is disposed is such that the shoe will be held tightly therein and against movement.

An aperture is formed in the member 36 in alignment with the shoe 38 for removably receiving a tension shoe 40 cooperating with the tension shoe 38 to create the tension in the wire. The tension shoe 40 is flat on the bottom surface thereof so that accidental rotation thereof will not vary its effectiveness. The shoe 40 is removably disposed in an aperture in the lower portion of a hollow threaded plug 41, the plug being receivable in the hollow threaded portion of the member 36, as shown in Fig. 1, and conditioned to rest on the inner bottom surface 42 thereof which serves as a stop for the plug. A lock nut 43 serves to lock the plug 41 in the position shown. A compression spring 44 is disposed in the plug with its lower end resting upon the head or upper end of the tension shoe 40, while the upper end of the spring is engaged by a set screw 45 threadedly disposed in the plug 41 to vary the tension of the spring 44. A lock nut 46 holds the set screw against movement when adjusted to a desired position.

In operation the opening for the arbor selected for the spring desired to be formed is varied depending upon the size of the arbor by loosening the screws 21 and 22, loosening also the screw 33, and moving the members 13 and 14 until the opening for the arbor, composed of the apertures 15 and 16 cooperating with the aperture 12, is of the desired size, after which the members 13 and 14 may be locked in their adjustment positions. The element 25 is then adjusted, if necessary, to position the desired tooth 26 in the proper position adjacent the arbor opening to cause forming of the desired pitch in the spring to be formed. The adjustment of the element necessitates loosening of the screw 33 a sufficient distance to allow the element to be removed from the pin 30 and turned in a desired direction to bring the selected tooth in position, at which time the element is moved inwardly toward the body, causing the pin to enter the aperture 28 then aligned with it, after which the screw 33 may be turned to rigidly secure the element against movement relative to the body.

The next step consists of threading the wire 35 of the selected gage, through the tensioning means, beneath a guide roller 48, supported by the body 10, and directing the wire between the wheel 25 and the member 13 to a position adjacent the arbor. Each arbor is provided with an aperture 49 into which the forward end of the wire 35 is disposed, the wire adjacent the end being first bent to enter the aperture and begin its movement about the arbor. In first threading the wire through the tensioning means the plug 41 is turned to move upwardly, after the lock nut 43 has first been loosened, to move the tension shoe 40 out of the passageway 37. After the wire has been threaded through the passageway and to the arbor as described, the plug 41 may be returned to its innermost position and locked in place by the nut 43, after which the set screw 45 may be adjusted to vary the tension of the spring 44 to cause a desired tension on the wire. The tension of the spring 44 is variable for various tensions in the wire, depending upon the gage of the various wires used, forming the springs on the arbors. When this adjustment has been made it may be maintained by holding the set screw against movement relative to the plug through the aid of the lock nut 46.

The device is now in condition for the forming of the spring which may be formed through relative rotation of the arbor and the device. For the purpose of illustration let it be assumed that the arbor is mounted for counterclockwise rotation in a suitable lathe and that the device is held by the operator against rotation but for lateral movement necessary to follow the convolutions of the wire as the spring is formed. The tooth disposed adjacent the arbor will remain in engagement therewith and as the arbor rotates the wire will be wound thereon, with each convolution being spaced like distances apart determined by the contour or thickness of the selected tooth 26 of the element 25. This operation continues until a spring of the desired length has been completed, at which time the wire may be severed, the spring thus formed removed from the arbor, and the operation repeated for the forming of another spring of like structure.

If more springs are desired than could be formed from one length of wire of the type chosen and it is necessary to feed another length of wire to the device, the plug 41 of the tensioning means may be moved upwardly, when freed by the lock nut 43, to free the passageway 37 of the shoe 40 for the threading of the new wire without affecting the tensioning means. In other words, after the new wire has been threaded the plug 41 may be returned to its stop 42 and locked in this position, causing application of the same pressure on the new wire that was applied to the first mentioned wire due to the fact that no variation has been caused in the tension of the spring 44.

To form springs of different diameters this may be accomplished through variation in the tension of the wire. For example, the tension may be increased to cause the convolutions to lay closely adjacent the arbor and complete a spring having an inner diameter substantially equal to the outer diameter of the arbor, or the tension may be increased so that the completed springs may be of increasing diameters from that of the arbor when released.

It will, therefore, be observed that the spring former is capable of forming springs of various diameters, of various pitches, and of various gages with an extremely wide degree of variations in each type, all of which may be accomplished through slight adjustments requiring very little time and effort.

The embodiment of the invention herein disclosed is illustrative only and may be widely modified and departed from in many ways without departing from the spirit and scope of the invention as pointed out in and limited only by the appended claims.

What is claimed is:

1. A strand handling apparatus comprising a body having an aperture therein for receiving an arbor for the winding of a strand thereon to form a spring, and an element having a plurality of substantially radially projecting pitch controlling members variable in contour and selectively positioned adjacent the arbor to control the pitch of a spring during relative rotation of the arbor and body to wind the strand on the arbor.

2. A strand handling apparatus comprising a body having an aperture therein for receiving an arbor for the winding of a strand thereon to form a spring, an element having a plurality of pitch controlling members variable in contour to control the pitch of a spring during relative rotation of the arbor and body to wind the strand on the arbor, and separate means to selectively position each member in a definite position relative to the arbor.

3. A strand handling apparatus comprising a body having an aperture therein for receiving an arbor for the winding of a strand thereon to form a spring, and a tension unit including tension member to engage the strand, means adjustable to cause the tension members to create a definite tension in the strand, and means to cause relative movement of the tension members away from each other for the threading of a new strand therebetween without affecting the adjusting means.

4. A strand handling apparatus comprising a body and a member having respective apertures therein of contours such that relative movement of the body and member to cause relative movement of the apertures will form an opening variable in size for arbors of various sizes, means to feed a strand to an arbor in the opening for the forming of a spring during relative rotation of the arbor and body, and an element having a plurality of radially projecting pitch controlling members variable in contour and selectively positioned adjacent an arbor in the said opening to control the pitch of a wire spring formed during relative rotation of the arbor and body to wind a strand on the arbor.

5. A strand handling apparatus comprising a body and a member having respective apertures therein of contours increasing in size from small portions to large portions thereof to cooperatively form an opening variable in size for arbors of various sizes, an element having a plurality of pitch controlling members variable in contour and selectively positioned adjacent an arbor in the said opening to control the pitch of a wire spring formed during relative rotation of the arbor and body to wind a strand on the arbor, and means to create predetermined variable tension in the strand.

6. A strand handling apparatus comprising a body having an aperture therein to receive an arbor for the winding of successive strands thereon to form springs, means to advance the strands successively along a path to the arbor, a fixed member disposed adjacent the said path, a unit having a movable tension member disposed opposite the fixed member, means to apply a predetermined pressure to the tension member toward the fixed member to create a definite tension on one strand, and means to support the unit for movement out of tensioning position for free feeding of another strand to the arbor and movement into tensioning position without varying the pressure applying means.

7. A strand handling apparatus comprising a body having an aperture therein to receive an arbor for the winding of successive strands thereon to form springs, means to advance the strands successively along a path to the arbor, a fixed member disposed adjacent the said path, a unit having a movable tension member disposed opposite the fixed member, spring means to apply a predetermined variable pressure to the tension member toward the fixed member to create a definite variable tension on one strand, and means to support the unit for movement out of tensioning position for free feeding of another strand to the arbor and movement into tensioning position without varying the pressure applying means.

EARL C. MOSS.
JAMES F. WILLIAMS.

CERTIFICATE OF CORRECTION.

Patent No. 2,273,133. February 17, 1942.

EARL C. MOSS, ET AL.

It is hereby certified that error appears in the printed specification of the above numbered patent requiring correction as follows: Page 2, second column, line 69, beginning with "1. A strand" strike out all to and including the word and period "arbor." on page 3, first column, line 2, comprising claim 1; and for the claims now numbered 2, 3, 4, 5, 6 and 7 respectively, read 1, 2, 3, 4, 5 and 6; page 1, in the heading to the printed specification, line 8, for "7 Claims." read --6 Claims.--; page 3, first column, line 17, claim 3, for "member" read --members--; and that the said Letters Patent should be read with this correction therein that the same may conform to the record of the case in the Patent Office.

Signed and sealed this 21st day of July, A. D. 1942.

(Seal)

Henry Van Arsdale,
Acting Commissioner of Patents.